US009881380B2

(12) United States Patent
Sorkine Hornung et al.

(10) Patent No.: US 9,881,380 B2
(45) Date of Patent: Jan. 30, 2018

(54) METHODS AND SYSTEMS OF PERFORMING VIDEO OBJECT SEGMENTATION

(71) Applicant: Disney Enterprises, Inc., Burbank, CA (US)

(72) Inventors: Alexander Sorkine Hornung, Zürich (CH); Federico Perazzi, Zürich (CH); Oliver Wang, Seattle, WA (US)

(73) Assignees: DISNEY ENTERPRISES, INC., Burbank, CA (US); ETH ZÜRICH (EIDGENÖSSISCHE TECHNISCHE HOCHSCHULE ZÜRICH, Zurich (CH)

( * ) Notice: Subject to any disclaimer, the term of this patent is extended or adjusted under 35 U.S.C. 154(b) by 79 days.

(21) Appl. No.: 15/045,102

(22) Filed: Feb. 16, 2016

(65) Prior Publication Data
US 2017/0236290 A1 Aug. 17, 2017

(51) Int. Cl.
G06K 9/34 (2006.01)
G06T 7/00 (2017.01)
(Continued)

(52) U.S. Cl.
CPC ........ G06T 7/0081 (2013.01); G06K 9/00718 (2013.01); G06K 9/00744 (2013.01);
(Continued)

(58) Field of Classification Search
CPC ........ G06K 9/6256; G06K 2009/4666; G06K 9/52; G06K 9/00744; G06K 9/4652;
(Continued)

(56) References Cited

U.S. PATENT DOCUMENTS 6,263,088 B1* 7/2001 Crabtree ............... G01S 3/7865
348/169
2005/0280809 A1* 12/2005 Hidai ................. G06K 9/00248
356/237.3
(Continued)

OTHER PUBLICATIONS

Pekka Rantalankila et al. "Generating Object Segmentation Proposals using Global and Local Searches", CVPR2014, Computer Vision Foundation, 2014, pp. 1-8.*
(Continued)

Primary Examiner — Samir Ahmed
(74) Attorney, Agent, or Firm — Kilpatrick Townsend & Stockton LLP

(57) ABSTRACT

Techniques and systems are described for performing video segmentation using fully connected object proposals. For example, a number of object proposals for a video sequence are generated. A pruning step can be performed to retain high quality proposals that have sufficient discriminative power. A classifier can be used to provide a rough classification and subsampling of the data to reduce the size of the proposal space, while preserving a large pool of candidate proposals. A final labeling of the candidate proposals can then be determined, such as a foreground or background designation for each object proposal, by solving for a posteriori probability of a fully connected conditional random field, over which an energy function can be defined and minimized.

20 Claims, 6 Drawing Sheets
(2 of 6 Drawing Sheet(s) Filed in Color)

(51) Int. Cl.
  *G06K 9/52* (2006.01)
  *G06K 9/00* (2006.01)
  *G06K 9/62* (2006.01)
  *G06K 9/46* (2006.01)
  *G06T 7/40* (2017.01)
(52) U.S. Cl.
  CPC ............. *G06K 9/4652* (2013.01); *G06K 9/52* (2013.01); *G06K 9/6256* (2013.01); *G06T 7/408* (2013.01); *G06K 2009/4666* (2013.01); *G06T 2207/20144* (2013.01)
(58) Field of Classification Search
  CPC .................. G06K 9/00718; G06T 7/11; G06T 2207/20081; G06T 7/194; G06T 2207/20076; G06T 2207/10016; G06T 7/73
  See application file for complete search history.

(56) References Cited

U.S. PATENT DOCUMENTS

| | | | | |
|---|---|---|---|---|
| 2009/0103779 | A1* | 4/2009 | Loehlein | G06K 9/00369 382/103 |
| 2009/0238457 | A1* | 9/2009 | Rittscher | G06K 9/0014 382/171 |
| 2009/0296989 | A1* | 12/2009 | Ramesh | G06K 9/00771 382/103 |
| 2010/0067764 | A1* | 3/2010 | Lu | G06K 9/72 382/131 |
| 2012/0274781 | A1* | 11/2012 | Shet | G06T 7/277 348/169 |
| 2015/0170006 | A1* | 6/2015 | Cohen | G06F 17/30247 382/180 |
| 2015/0371397 | A1* | 12/2015 | Wang | G01B 11/14 382/159 |
| 2016/0140424 | A1* | 5/2016 | Wang | G06K 9/66 382/156 |

OTHER PUBLICATIONS

Arbeláez et al., "Multiscale Combinatorial Grouping", In Proc. CVPR, 2014.
Banica et al., "Video Object Segmentation by Salient Segment Chain Composition", In the IEEE International Conference on Computer Vision (ICCV) Workshops, Dec. 2013.
Belongie et al., "Spectral Partitioning With Indefinite Kernels Using the Nyström Extension", In Proc. ECCV, 2002.
Brendel et al., "Video Object Segmentation by Tracking Regions", In Proc. ICCV, 2009.
Brox et al., "Object Segmentation by Long Term Analysis of Point Trajectories", In Proc. ECCV, 2010.
Brutzer et al., "Evaluation of Background Subtraction Techniques for Video Surveillance", In Proc. CVPR, 2011.
Campbell et al., "Fully-Connected Crfs With Non-Parametric Pairwise Potential", In Proc. CVPR, 2013.
Carreira et al., "CPMC: Automatic Object Segmentation Using Constrained Parametric Min-Cuts", IEEE Transactions on Pattern Analysis and Machine Intelligence, 34(7), 2012, 1312-1328.
Carreira et al., "Object Recognition by Sequential Figure-Ground Ranking", Int. J. Comput. Vis., 98(3), 2012, 243-262.
Chaudhry et al., "Histograms of Oriented Optical Flow and Binet-Cauchy Kernels on Nonlinear Dynamical Systems for the Recognition of Human Actions", In Proc. CVPR, 2009.
Cheng et al., "BING: Binarized Normed Gradients for Objectness Estimation At 300fps", In Proc. CVPR, 2014.
Cheung et al., "Robust Techniques for Background Subtraction in Urban Traffic Video", In Visual Communications and Image Processing, vol. 5308, 2004, 881-892.
Cox et al., "Multidimensional Scaling", Chapman & Hall, London, 1994.
Criminisi et al., "Bilayer Segmentation of Live Video", In Proc. CVPR, 2006.
De Silva et al., "Global Versus Local Methods in Nonlinear Dimensionality Reduction", In S. Becker, S. Thrun, and K. Obermayer, editors, Proc. NIPS, 2002.
Endres et al., "Category-Independent Object Proposals With Diverse Ranking", IEEE TPAMI, 36(2), 2014, 222-234.
Faktor et al., "Video Segmentation by Non-Local Consensus Voting", In Proc. BMVC, 2014.
Girshick et al., "Rich Feature Hierarchies for Accurate Object Detection and Semantic Segmentation", In Proc. CVPR, 2014.
Grundmann et al., "Efficient Hierarchical Graph-Based Video Segmentation", In Proc. CVPR, 2010.
Hayman et al., "Statistical Background Subtraction for a Mobile Observer", In Proc. ICCV, 2003.
Hickson et al., "Efficient Hierarchical Graph-Based Segmentation of RGBD Videos", In Proc. CVPR, 2014.
Irani et al., "A Unified Approach to Moving Object Detection in 2d and 3d Scenes", IEEE TPAMI, 20(6), 1998, 577-589.
Krähenbühl et al., "Efficient Inference in Fully Connected CRFs With Gaussian Edge Potentials", In Proc. NIPS, 2011.
Krähenbühl et al., "Geodesic Object Proposals", In Proc. ECCV, 2014.
Lafferty et al., "Conditional Random Fields: Probabilistic Models for Segmenting and Labeling Sequence Data", In ICML, 2001.
Lee et al., "Key-Segments for Video Object Segmentation", In Proc. ICCV, 2011.
Li et al., "Video Segmentation by Tracking Many Figure-Ground Segments", In Proc. ICCV, 2013.
Lin et al., "Microsoft COCO: Common Objects in Context", In Proc. ECCV, 2014.
Lowe, "Distinctive Image Features From Scale-Invariant Keypoints", IJCV, 60(2), 2004, 91-110.
Ma et al., "Maximum Weight Cliques With Mutex Constraints for Video Object Segmentation", In Proc. CVPR, 2012.
Ochs et al., "Object Segmentation in Video: A Hierarchical Variational Approach for Turning Point Trajectories Into Dense Regions", In Proc. ICCV, 2011.
Papazoglou et al., "Fast Object Segmentation in Unconstrained Video", In Proc. ICCV, 2013.
Pedregosa et al., "Scikit-learn: Machine Learning in Python", Journal of Machine Learning Research, 12, 2011, 2825-2830.
Perazzi et al., "Saliency Filters: Contrast Based Filtering for Salient Region Detection", In Proc. CVPR, 2012.
Platt, "Fastmap, Metricmap, and Landmark Mds Are All Nystrom Algorithms", In Proc. Workshop on Artificial Intelligence and Statistics, 2005, 261-268.
Platt, "Probabilistic Outputs for Support Vector Machines and Comparisons to Regularized Likelihood Methods", In Advances in Large Margin Classifiers, 1999, 61-74.
Ramakanth, "Seamseg: Video Object Segmentation Using Patch Seams", In Proc. CVPR, 2014.
Ren et al., "Statistical Background Modeling for Non-Stationary Camera", Pattern Recognition Letters, 24(1-3), 2003, 183-196.
Rother et al., ""GrabCut"—Interactive Foreground Extraction using Iterated Graph Cuts", ACM Transactions on Graphics (TOG), vol. 23, No. 3, Aug. 2004, pp. 309-314.
Rubinstein et al., "Improved Seam Carving for Video Retargeting", ACM Trans. Graph., 27(3), 2008.
Varas et al., "Region-Based Particle Filter for Video Object Segmentation", In Proc. CVPR, 2014.
Wang et al., "Boosting Support Vector Machines for Imbalanced Data Sets", In Proc. ISMIS, 2008.
Xu et al., "Evaluation of Super-Voxel Methods for Early Video Processing", In Proc. CVPR, 2012.
Zhang et al., "Video Object Segmentation Through Spatially Accurate and Temporally Dense Extraction of Primary Object Regions", In Proc. CVPR, 2013.

\* cited by examiner

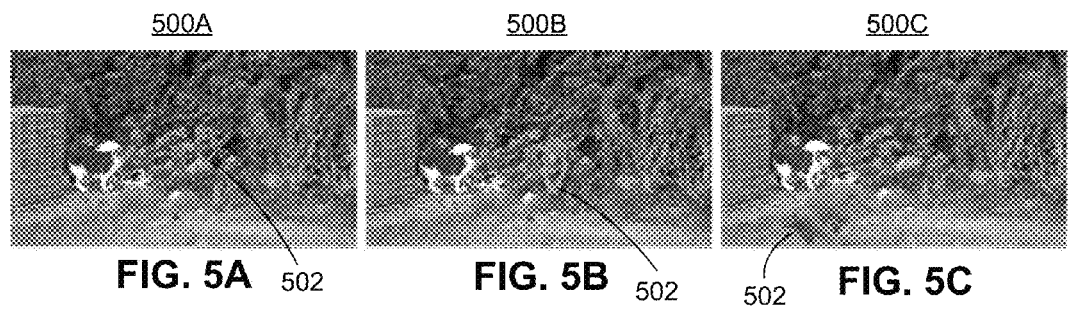
FIG. 5A 502  FIG. 5B 502  502 FIG. 5C
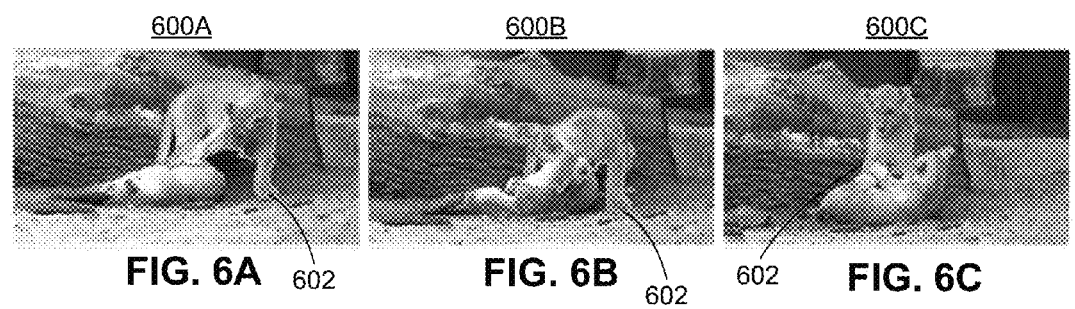
FIG. 6A 602  FIG. 6B 602  602 FIG. 6C
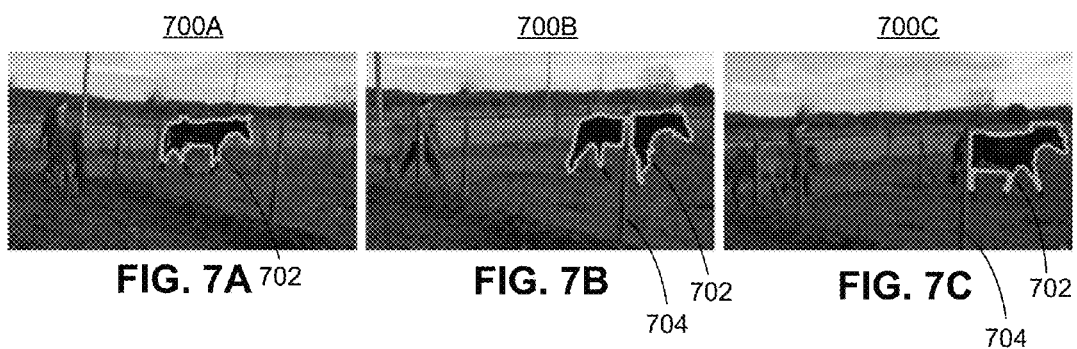
FIG. 7A 702  FIG. 7B 702 / 704  FIG. 7C 702 / 704

METHODS AND SYSTEMS OF PERFORMING VIDEO OBJECT SEGMENTATION

FIELD

The present disclosure relates generally to video segmentation, and more specifically to performing video object segmentation using fully connected object proposals.

BACKGROUND

Video segmentation includes separating video into disjoint portions representing a foreground object and background regions. Video segmentation is a building block for numerous applications, including video editing and post-processing, video retrieval, analysis of large video collections, activity recognition, and other applications. Some approaches to video segmentation are based on background subtraction, tracking of feature points and homogeneous regions, spatiotemporal graph-cuts, hierarchical clustering, object proposals, or the like.

SUMMARY

Techniques and systems are described for performing video segmentation using fully connected object proposals. For example, given a group of video frames as input, a number of object proposals for each video frame are generated. In some examples, one or more ground proof object proposals can also be provided as input and used to generate the number of object proposals across the group of video frames. A pruning step can be performed to retain only high quality proposals that have sufficient discriminative power (e.g., object proposals that do not overlap with both the foreground and background regions of a frame). The pruning step can include a rough classification and subsampling of the data using a classifier to reduce the size of the proposal space while preserving a large pool of candidate proposals. A final labeling of the candidate proposals can then be determined. For example, a foreground or background designation or label of each object proposal can be determined by solving for a posteriori probability of a fully connected conditional random field, over which an energy function can be defined. In some examples, each labeled proposal casts a vote for all pixels that it overlaps, and the aggregate result yields the final foreground-background segmentation for that labeled proposal.

According to at least one example, a computer-implemented method of segmenting video data is provided that includes obtaining input data, the input data including a plurality of video frames. The method further includes computing object proposals for the plurality of video frames. An object proposal includes a region of a video frame that is a candidate for containing at least a portion of a background object or at least a portion of a foreground object. The method further includes refining the computed object proposals into a refined set of object proposals. The refined set includes fewer object proposals than the computed object proposals. The method further includes generating a fully-connected random field. The fully-connected random field connects the object proposals of the refined set of object proposals across the plurality of video frames. The method further includes solving for a posteriori probability of the fully-connected random field, the posteriori probability providing a background designation or a foreground designation for each object proposal of the refined set of object proposals.

In some embodiments, a system is provided for segmenting video data. The system includes a memory storing a plurality of instructions and one or more processors. The one or more processors are configurable to: obtain input data, the input data including a plurality of video frames; compute object proposals for the plurality of video frames, an object proposal including a region of a video frame that is a candidate for containing at least a portion of a background object or at least a portion of a foreground object; refine the computed object proposals into a refined set of object proposals, the refined set including fewer object proposals than the computed object proposals; generate a fully-connected random field, the fully-connected random field connecting the object proposals of the refined set of object proposals across the plurality of video frames; and solve for a posteriori probability of the fully-connected random field, the posteriori probability providing a background designation or a foreground designation for each object proposal of the refined set of object proposals.

In some embodiments, a computer-readable memory storing a plurality of instructions executable by one or more processors is provided. The plurality of instructions comprise: instructions that cause the one or more processors to obtain input data, the input data including a plurality of video frames; instructions that cause the one or more processors to compute object proposals for the plurality of video frames, an object proposal including a region of a video frame that is a candidate for containing at least a portion of a background object or at least a portion of a foreground object; instructions that cause the one or more processors to refine the computed object proposals into a refined set of object proposals, the refined set including fewer object proposals than the computed object proposals; instructions that cause the one or more processors to generate a fully-connected random field, the fully-connected random field connecting the object proposals of the refined set of object proposals across the plurality of video frames; and instructions that cause the one or more processors to solve for a posteriori probability of the fully-connected random field, the posteriori probability providing a background designation or a foreground designation for each object proposal of the refined set of object proposals.

In some embodiments, the input data further includes one or more ground proof object proposals known to belong to a foreground object. In such embodiments, the object proposals for the plurality of video frames are computed using the one or more ground proof object proposals. In some embodiments, only some of the object proposals are computed using the ground proof object proposals.

In some embodiments, refining the computed object proposals into the refined set of object proposals includes: extracting feature descriptors from the computed object proposals, wherein a feature descriptor for an object proposal includes at least one or more of appearance features, motion features, or spatial features; training a classifier with the feature descriptors; and selecting object proposals for the refined set of object proposals using the classifier, wherein the selected object proposals include object proposals from the computed object proposals that include a non-overlapping background object proposal or a non-overlapping foreground object proposal.

In some embodiments, the fully-connected random field allows propagation of feature information between object proposals of the refined set of object proposals across the plurality of video frames.

In some embodiments, solving for the posteriori probability of the fully-connected random field includes minimizing an energy function defined over a set of unary potentials and a set of pairwise potentials. A unary potential includes a foreground estimate or a background estimate for an object proposal based on a classifier. A pairwise potential includes a confidence of a foreground estimate or a background estimate based on a linear combination of features of a pair of object proposals from the refined set of object proposals across the plurality of video frames. In some embodiments, the linear combination of features includes an appearance kernel defining a difference in color between the pair of object proposals, a spatial kernel defining a spatial overlap between the pair of object proposals, a trajectory kernel defining a point trajectory of a related point in the pair of object proposals across the plurality of video frames, or a temporal kernel defining a difference between frame numbers of the pair of object proposals.

In some embodiments, a pixel in a video frame is included in multiple object proposals and includes multiple object proposal designations, wherein the object proposal designations provide votes for a background designation or a foreground designation, and further comprising selecting a background designation or a foreground designation for the pixel based on the votes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the present invention are described in detail below with reference to the following drawing figures:

FIG. 5A-FIG. 5C illustrate an example of video frames with a final segmentation using the techniques described herein.

FIG. 6A-FIG. 6C illustrate an example of video frames with a final segmentation using the techniques described herein.

FIG. 7A-FIG. 7C illustrate an example of video frames with a final segmentation using the techniques described herein.

DETAILED DESCRIPTION

Figure 1:
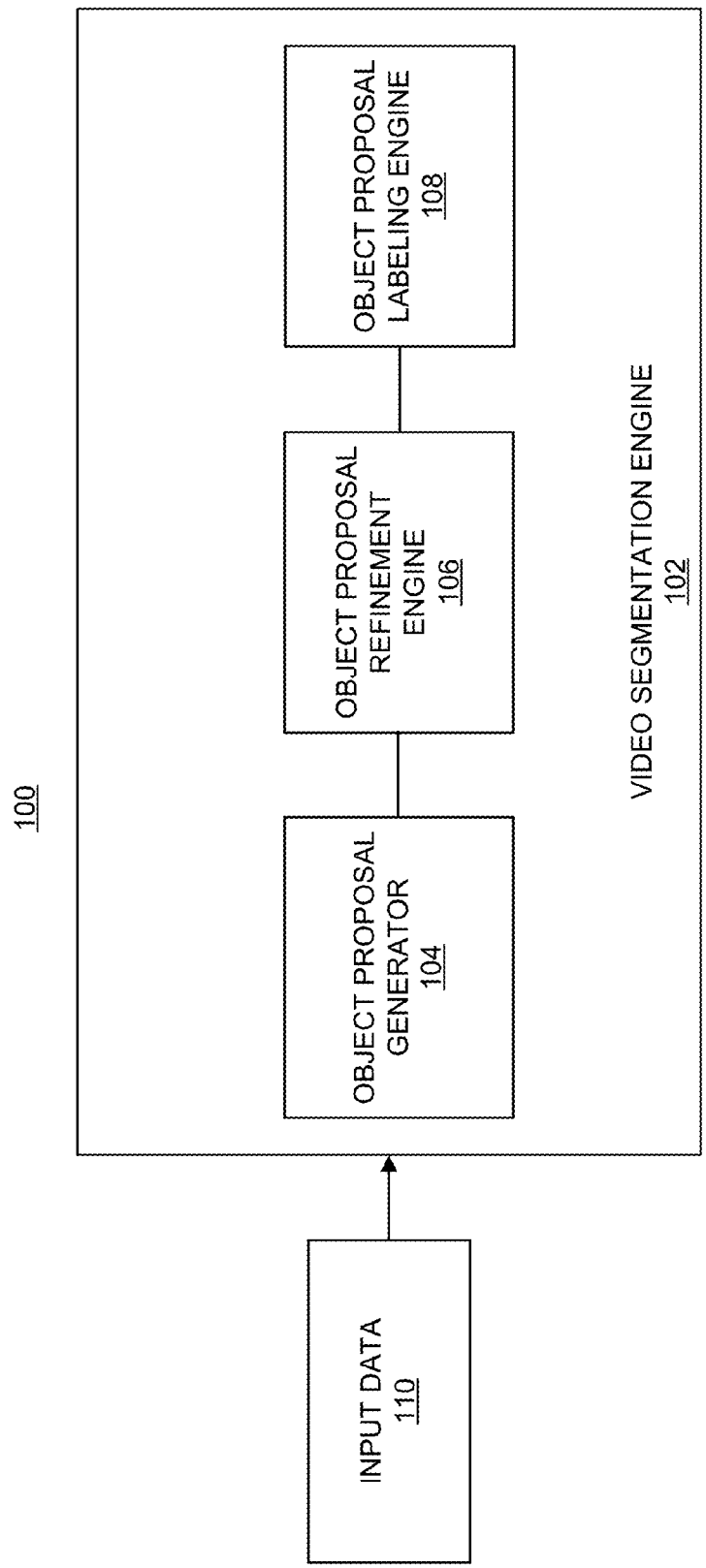
FIG. 1 illustrates an example of a system for performing video segmentation, in accordance with an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Video object segmentation includes partitioning of video frames into separate partitions, one partition representing one or more foreground objects and the other partition representing one or more background regions. In one illustrative example, video segmentation can be used to detect a primary object in the foreground of the video. In another example, video segmentation can be used to detect multiple foreground objects. Video segmentation provides an essential building block for numerous applications, such as video editing and post-processing, video retrieval, analysis of large video collections, activity recognition, among others. Video segmentation can be performed using background subtraction, tracking of feature points and homogeneous regions, spatiotemporal graph-cuts, or hierarchical clustering. In some cases, video segmentation can make use of per-frame object proposals and employ different techniques to select a set of temporally coherent segments, one per frame. However, existing techniques for video segmentation are limited in segmentation quality and in their ability to segment videos with fast motion and occlusions.

Techniques and related systems are provided herein for performing video segmentation using multiple object proposals. The video segmentation techniques can include minimization of a novel energy function defined over a fully connected graph of object proposals. In some examples, the video segmentation techniques can, given a group of video frames as input, generate a number of object proposals for each video frame. In some cases, one or more ground proof object proposals can also be provided as input. The ground proof object proposals can be used to generate one or more of the object proposals across the group of video frames. A pruning step can be performed to retain high quality proposals that have sufficient discriminative power, which can include object proposals that do not overlap with both the foreground and background regions of a frame. The pruning step can include a rough classification and sub sampling of the data using a classifier to reduce the size of the proposal space while preserving a large pool of candidate proposals. One example of a classifier includes a support vector machine (SVM). One of ordinary skill in the art will appreciate that other classifiers can be used to classify and subsample the object proposals. A final label for each of the candidate proposals can then be determined. For example, a foreground or background designation (or label) of each object proposal can be determined by solving for a posteriori probability of a fully connected conditional random field. An energy function can be defined over the fully connected conditional random field (CRF). For example, as described in more detail herein, the energy function can be defined over a set of unary potentials and a set of pairwise potentials. In one example, solving for the posterior probability includes minimizing the energy function to determine the final label for each of the candidate proposals. In some examples, each labeled proposal casts a vote for all pixels that it overlaps. The aggregate result of votes for pixels of a proposal yields the final foreground-background segmentation for that proposal.

The techniques and systems provide an efficient approach that exploits a fully connected spatiotemporal graph built over object proposals. A similarity term is mapped into a Euclidian space, which is computationally efficient for optimization and well suited for modeling long-range connections. The fully connected nature of the graph implies information exchange between both spatially and temporally distant object proposals across video frames, which in turn enables the techniques to be robust, such as in difficult cases of fast frame-to-frame motion and object occlusions. The novel energy term incorporates sparse yet confident long range feature tracks, ensuring similar temporal labeling of objects. The techniques also enable the grouping of multiple overlapping proposals in the same frame, yielding robustness to outliers and incorrect proposal boundaries.

FIG. 1 illustrates a system 100 for performing video segmentation. The system 100 includes a video segmentation engine 102 that performs the video segmentation using an energy function defined over a fully connected graph of object proposals. The video segmentation engine 102 receives input data 110. The input data 110 can include a plurality of video frames making up a video or a sequence of the video. The video frames include one or more background regions and one or more foreground objects. The video frames can be segmented into two disjoint sets of pixels, one set representing the one or more foreground objects and the other sets of pixels representing the one or more background regions. In some examples, the input data 110 can also include one or more ground proof object proposals that are known to be part of one or more foreground objects.

The video segmentation engine 102 can perform three general stages to segment the video data. For example, a first stage can include computing a set of object proposals $S^t = \{S_i^t\}$ for each video frame $V^t$ of the input video data (labeled input video V). The set of object proposals $S^t$ can be generated by the object proposal generator 104. The object proposal generator 104 can compute the set of object proposals $S^t$ so that the set includes a wide range of different proposals, including a number of background segments that overlap with a foreground object. The second stage can include refining the computed object proposals into a refined set of object proposals. The object proposal refinement engine 106 can resample or refine the computed object proposals. For example, the object proposal refinement engine can train a classifier (e.g., a support vector machine SVM-based classifier or other suitable classifier) in order to resample $S^t$ for each of the video frames $V^t$ (referred to as S, representing all computed object proposals) into a smaller set of higher quality proposals (referred to as a refined set $\bar{S}$ of object proposals). The third stage can include labeling the proposals with a background designation or a foreground designation. The third stage can be performed by the object proposal labeling engine 108. For example, the object proposal labeling engine 108 can further refine the classification of the proposals S by solving for the maximum a posteriori inference on a densely connected conditional random field (CRF). The fully connected graph structure is coupled with a novel energy function that considers overlap between point-tracks in pairwise potentials, exploits temporal information, and ensures robustness to fast-motion and occlusions. Each of the stages are now described in detail.

The object proposal generator 104 can compute the set of object proposals for each video frame of a plurality of video frames. An object proposal includes a region of a video frame that is a candidate for containing at least a portion of a background region (or background object) or a candidate for containing at least a portion of a foreground object. For example, an object proposal can include a group of pixels in the video frame that are likely to represent at least a portion of a foreground or background object in the frame. Algorithms that can be used to compute object proposals are generally designed to have a high recall, proposing at least one region for as many objects in the image as possible. While the set of candidates must remain of limited size, the task of selecting positive samples is left to later stages, and the ratio of regions that truly belong to an object (precision) is usually not considered a measure of performance. While some approaches leverage the high recall property by assuming that there is one good proposal per-frame, the techniques described herein exploit the redundancy in the data of multiple proposals per frame that have a high degree of overlap with the background regions and the foreground object.

Any technique for computing object proposals from an image in a video frame can be used by the object proposal generator 104. In one example, the object proposal generator 104 can identify critical level sets by analyzing their evolution rate with respect to geodesic distance transforms that are computed for seeds placed in an image of a video frame. The seeds can be placed by classifiers that are trained to discover objects in the image. The geodesic distance transform can be computed in near-linear time and each computed transform is used to generate proposals at different scales. Given an input frame, the object proposal generator 104 can compute an over-segmentation into superpixels. A superpixel includes a grouping of spatially coherent pixels that share similar low-level features. Superpixels can be used instead of a per-pixel analysis. The use of superpixels provides a large reduction in image primitives, resulting in increased computational efficiency for later processing steps and allows for more complex algorithms that might be computationally infeasible on the pixel level. The object proposal generator 104 can also compute a boundary probability map that associates a boundary probability with each superpixel edge. The boundary probability map can be represented as a weighted graph.

A set of seed superpixels can then be identified such that all objects in the image are targeted with a set of automatically placed seeds. A learning-based approach can be used that implements trained classifiers to adaptively place seeds. For each seed, foreground and background masks can be generated that are used to compute a geodesic distance transform. For example, the seed itself can be used as the foreground mask and the image boundary or the empty set can be used as background. In another example, a learning-based approach can be used for computing the masks. For each foreground-background mask, a signed geodesic distance transform (SGDT) can be computed over the image. Each level set of the SGDT specifies an image region, but not all of the regions form quality proposals. A small set of high-quality object proposals can be extracted by identifying certain critical level sets of the SGDT. All proposals produced for all seeds and masks can then be sorted to filter out near-duplicates. One of ordinary skill in the art will appreciate that any other object proposal technique can be used. The result provides a plurality of object proposals that can include overlapping and non-overlapping foreground and background objects or regions.

As previously described, the techniques described herein exploit the redundancy of multiple proposals per frame having a high degree of overlap with the foreground object. In order to have a significant amount of such positive instances, the parameters that control seed placement and level set selection can be modified to generate a large number of object proposals per frame (e.g., approximately 10,000 proposals per frame, 15,000 proposals per frame, 20,000 proposals per frame, or any other suitable number of proposals).

In some cases, the resulting set of object proposals may be imbalanced, with potentially many more proposals on background regions than on foreground, depending on object size. Furthermore, many proposals may be overlapping, covering both foreground and background. For example, the foreground object may have similar features (e.g., similar color, shape, or the like) as the background region, resulting in an object proposal including pixels from the foreground object and the background region. Imbalanced and overlapping object proposals can negatively impact segmentation, both in terms of quality and efficiency. To overcome this problem, a classifier can be self-trained and the pool of proposals can be resampled or refined.

Per-frame pruning or resampling can be performed by the object proposal refinement engine 106 to refine the set of computed object proposals into a refined set of object proposals. By refining the computed object proposals, the set of proposals is rebalanced and only object proposals with higher discriminative power are selected. For example, a refined set of object proposals that do not overlap both with foreground and background are computed as a result of the pruning technique. Any suitable classifier can be used to refine the set of computed object proposals into the refined set of object proposals. In one example, a support vector machine (SVM) classifier can be used. A SVM has proven robustness to skewed vector spaces resulting from class imbalance and relatively fast performance. The classifier is trained and operates on elements of the set of object proposals S, separating those that overlap with foreground from those that belong to the background. The computed set S is then resampled into the refined set $\bar{S}$. As described further below, the output of the classifier is used to initialize the unary potentials of the conditional random field (CRF).

Figure 2:
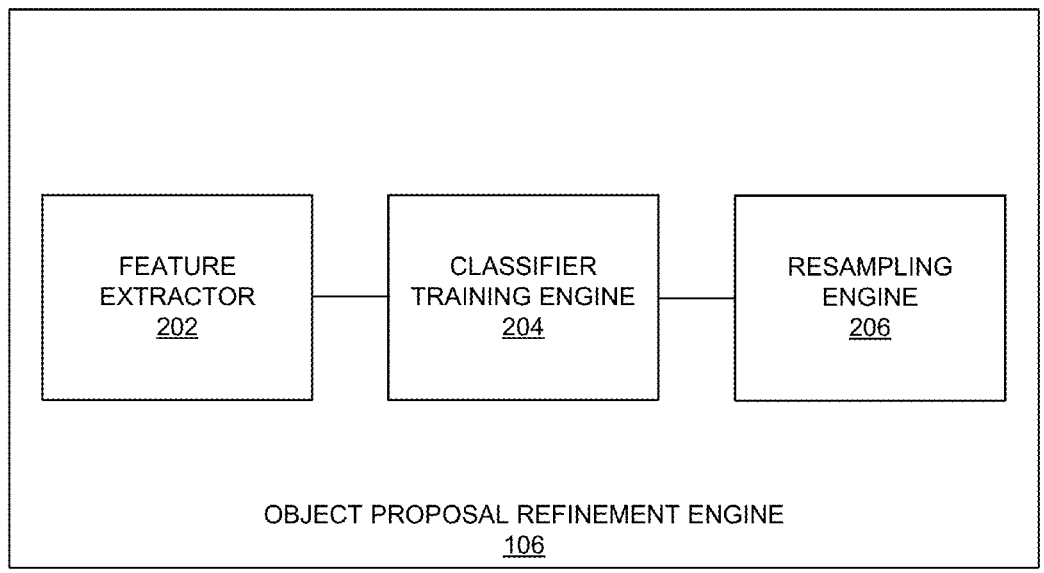
FIG. 2 illustrates an example of an object proposal refinement engine, in accordance with an embodiment of the present invention.

FIG. 2 illustrates components of the object proposal refinement engine 106 used to refine the set of computed object proposals. Initially, feature extraction is performed from the computed set of object proposals S. For example, the feature extractor 202 can extract, from each of the computed object proposals, a set of features that characterize the appearance, motion, and objectness of each object proposal. For instance, a feature descriptor for an object proposal can be extracted, and can include appearance features, motion features, or objectness features. The feature descriptor can include a vector with values representing each of the features. The extracted features and illustrative values for the features are summarized in Table 1. While certain features and values of those features are used as an example herein, one of ordinary skill in the art will appreciate that other features of a video frame can be used to describe the properties of the frame. One of ordinary skill will also appreciate that other suitable values for the example features used herein can be used.

An appearance feature of an object proposal can include global appearance and local appearance. The global appearance and spatial support of an object proposal can be defined in terms of an average color of the proposal, which corresponds to the average color of the pixels contained in the proposal, an average position of the proposal in the image of a frame (e.g., a centroid of the proposal, the average position, in terms of image coordinates, of the pixels contained in the proposal), and the area of the proposal, which is equal to the number of pixels contained in the proposal. The local appearance can be encoded with a Histogram of Oriented Gradients (HOG) computed over the proposal bounding box rescaled to a number of pixels (e.g., 16×16, 32×32, 64×64, or other suitable number of pixels) and divided into overlapping cells quantized into a certain amount of bins (e.g., a division into cells of 2×2, 4×4, 8×8, 16×16, or other pixel division, overlapping a certain percentage, such as 10%, 20%, 30%, 40%, 50%, or other suitable percentage, and quantized into any suitable number of bins). In one example, as shown in Table 1, a proposal bounding box is rescaled to 64×64 pixels and divided into 8×8, 50% overlapping cells quantized into nine bins. One of ordinary skill will appreciate that other rescaling or cell division can be used.

A motion feature of an object proposal can be defined with a Histogram of Oriented Optical Flow (HOOF) extracted from the proposal bounding box also rescaled to a number of pixels (e.g., 16×16, 32×32, 64×64, or other suitable number of pixels) and quantized into a certain number of bins (e.g., 9, 16, 32, or other suitable number of bins). In one example, as shown in Table 1, an object proposal can be defined with a HOOF extracted from the proposal bounding box rescaled to 64×64 pixels and quantized into 32 bins (the dimension being the number of bins). In another example, the bounding box can be rescaled to 100×100 pixels and quantized into 40 bins. One of ordinary skill will appreciate that other rescaling or quantization can be used.

An objectness feature (or spatial feature) of an object proposal is measured in terms of region boundaries encoded by normalized gradients patches. For example, as shown in Table 1, an object proposal is measured in terms of region boundaries encoded by 8×8 normalized gradient patches (resulting in a dimension of 64). The set of features for an object proposal can then be aggregated into a dimensional descriptor with the aggregated dimensions of the features (e.g., a 1398 dimensional descriptor in the example of Table 1).

TABLE 1

Set of features extracted from each object proposal by the classifier and corresponding dimensionality.

| Feature | Description | Dim |
|---------|-------------|-----|
| (ACC) | Area, centroid, average color | 6 |
| (HOOF) | Histogram of Oriented Optical Flow | 32 |
| (NG) | Objectness via normalized gradients | 64 |
| (HOG) | Histogram of oriented gradients | 1296 |

The classifier training engine 204 can then train the classifier using the extracted features. The classifier is trained from a set of proposals $\tilde{S}$ known to belong to a foreground object and the features of the proposals $\tilde{S}$. For example, the features of the proposals $\tilde{S}$ (e.g., feature descriptors or vectors) can be known to belong to a foreground object or a background object or region, and can be used to train the classifier. The classifier can then be used to define the computed object proposals S in a same video frame as the known proposals $\tilde{S}$ and/or across several video frames based on the extracted features (e.g., to define how the feature descriptors or vectors of the object proposals S should be classified). The known set of proposals $\tilde{S}$ can be referred to as ground proof object proposals. The set $\tilde{S}=\{\tilde{s}_i\}$ can be determined using automatic approaches (e.g., salient object detectors), determined based on objectness, manually provided using interactive video editing tools, or a combination thereof. In one illustrative example, one or two foreground proposals per video sequence can be used. The set $\tilde{S}$ can be augmented with all proposals that spatially overlap with one of the ground proof initial elements by a factor of more than a threshold $\tau$ (e.g., 0.5, 0.6, 0.7, 0.75, 0.8, 0.85, 0.9, 0.95, or any other suitable percentage of overlap). All remaining proposals are marked background. The classifier is trained on the labeled data. For example, a binary SVM classifier with linear kernel and soft margins can be trained on the labeled data, yielding the score function $C(x_i)=w^T x_i+b$, which measures the distance of the proposal $\tilde{s}_i$ with associated feature vector $x_i$ from the decision surface $w_\perp$. The decision surface $w_\perp$ is defined as the hyperplane partitioning the underlying vector space, in two sets, one for each class of foreground and background proposals. While $\text{sign}(C(x_i))$ is enough to classify proposals as either foreground or background, the system 100 can additionally include the distance from the hyperplane $w^T x_i+b \in [-\infty, +\infty]$ as the posterior probability $P(y_i|x_i) \in [0,1]$ in order to initialize the unary potentials of the condition random field, as described below with respect to the object proposal labeling engine 108. Platt Scaling can be used to fit a logistic regressor Q to the output of the SVM classifier and the true class labels, such that $Q(C(x_i))\mathbb{R} \rightarrow P(y_i|x_i)$. Parameters of the SVM are described below in various implementation examples.

The resampling engine 206 can then refine the set of computed object proposals by performing classification and resampling to generate a refined set of object proposals that include fewer object proposals than the computed object proposals. For example, given the trained classifier C, the resampling engine 206 roughly subdivides the set of object proposals $S^t$ (from the computed object proposals 5) extracted at frame t into two spatially disjoint sets $S_+^t$ and $S_-^t$, with $\cup S_+^t$ lying within the foreground region and $\cup S_+^t$ lying on the background region. Initially, $S_+^t = \{s_i^t | P(y_i|x_i) > 0.5\}$ is formed. The resampling engine 206 can then select elements from the set of proposals classified as background such that they do not overlap with $S_+^t$, forming $S_-^t = \{s_i^t | |s_+^t \cap s_i^t| > \bar{\epsilon}\}$. The slack variable $\bar{\epsilon}$ is necessary to avoid $s_-^t = \varphi$, which can happen in videos where the foreground object occupies most of the frame. In some examples, $\bar{\epsilon}$ can be initially set to 0 and iteratively incremented (e.g., with steps of 1, 5, 10, 15, 20, or other suitable increment), until the constraint $|s_-^t| > 500$ is satisfied or the total amount of background proposal is reached. In one illustrative example, approximately 10% of the generated proposals are retained (e.g., around 2,000 proposals per-frame out of 20,000 computed proposals per-frame).

Figure 3:
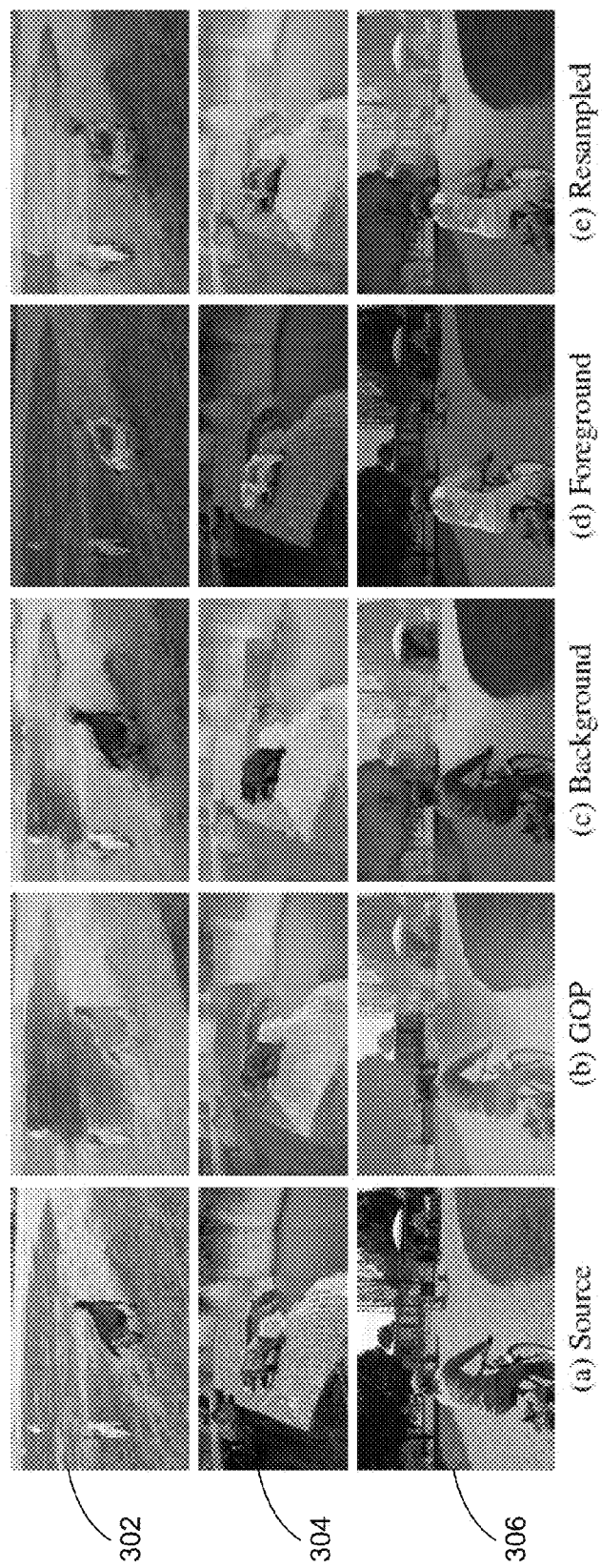
FIG. 3 illustrates an example of rebalancing or refining a set of proposals by selecting those with higher discriminative power, in accordance with an embodiment of the present invention.

FIG. 3 illustrates the distribution of object proposals, including original and newly generated proposals. Given arbitrarily chosen frames 302, 304, 306 of three different video sequences, a distribution of object proposals on each of the frames 302, 304, 306 is shown in (b). For example, colormaps are computed as the sum of the object proposals normalized to range [0,1]. Starting from the source images 302, 304, 306 in (a), the object proposal generator 104 generates a set of geodesic object proposals with resulting distribution over the image (b), with the different object proposals being represented by the different colors. Many of the proposals fall on background regions of the images 302, 304, 306. As described above, a classifier is used by the object proposal refinement engine 106 to resample the set of proposals into background (as shown by the colored regions in the images of column (c)) and foreground (as shown by the colored regions in the images of column (d)). The new set of proposals in the images shown in column (e) correspond to the union of the images in column (c) and the images in column (d) (the union being represented by the union function $\cup$). The new set of proposals is balanced and contains proposals with higher discriminative power.

The pruning and resampling step has a positive impact on the quality of the video segmentation. The resulting classification provides rebalancing of positive and negative instances. At this point, the system has ground proof segmentation in one or more frames (with known segmentation of a foreground object and background region), and, for each frame, has object proposals from the classifier that are not final segmentations with labels, but are an estimate of what could be a foreground object and what is background. At this point, the proposal labeling or classification is a per-frame decision. For example, the classifier is trained from the known object proposals and features, and then is applied individually to every frame without knowledge with regard to proposal labeling applied to other frames. Because it is a per-frame decision, the classification using only the classifier can be noisy. In some cases, one or more of the estimated proposals from the refined set may cover only a portion of a foreground object, and may not necessarily completely cover the entire foreground object of interest.

The union of the two newly generated sets $\bar{S}^t = S_+^t \cup S_-^t$ forms the input $\bar{S}=\{\bar{S}^t\}$ to the next step in the video segmentation, which uses the refined set of proposals to provide a more definitive background or foreground label or designation. The proposal labeling provides a global solution considering spatial and temporal information jointly with the color appearance. For example, using the refined set of object proposals $\bar{S}$, the object proposal labeling engine 108 can perform fully connected proposal labeling of each of the proposals from the refined set $\bar{S}$. In order to accurately classify elements of $\bar{S}$, a smoothness prior is enforced that indicates that similar proposals should be similarly classified. Conditional random fields (CRFs) provide a natural framework to incorporate all mutual spatiotemporal relationships between proposals, as well as the initial proposal confidences. By using a CRF, the system can connect proposals in one frame with the proposals in the other frames, with pairwise edges being provided between the proposals in the whole video sequence. These graph edges allow the system to propagate information between frames. For example, given a frame in which the system is sure that there is good segmentation of a foreground object from background, and a next frame in which the proposals are not very reliable (e.g., a classifier made a bad classification of the proposals), the object proposal labeling engine 108 can propagate the graph edges to the less certain frames to get a good segmentation estimate of those frames. The system attempts to maximize the probability that after every proposal in a video sequence is compared with every other proposal, there is an agreement between the proposals that they all are either foreground or background and they have a good confidence in the designation.

To perform the fully connected proposal labeling, the object proposal labeling engine 108 can define a set of labels L={bg=0, fg=1}, corresponding to background and foreground regions respectively. Using the fully connected proposal labeling described below, each proposal can be given either a bg label (0) or a fg label (1) to designate the proposal as background or foreground. Let F={$f_i$} be a newly generated set of features extracted from each element in $\tilde{S}$, as defined in Equation (3). The object proposal labeling engine 108 can also define a set of random variables Y={$y_i$}, $y_i \in L$, with the $\epsilon$ being an "element-of" symbol indicating that $y_i$ is an element of L. The object proposal labeling engine 108 generates or obtains and uses a fully-connected random field (Y, X∪F) defined over a graph g=(V, $\epsilon$) whose nodes correspond to object proposals. The term Z(X, F) is the partition function. The posterior probability for this model is defined as $$P(Y \mid X, F) = \frac{1}{Z(F)} \exp(-E(Y \mid X, F)),$$

with the corresponding Gibbs energy defined over the set of all unary and pairwise cliques (see Unary and Pairwise Potentials below) as:

$$E(Y \mid X, F) = \sum_{i \in V} \psi_u(y_i; X) + \sum_{i,j \in E} \psi_p(y_i, y_j; F). \quad (1)$$

The object proposal labeling engine 108 determines the unary potentials that are used in equation (1) as the unary term $\psi_u$. In some cases, the unary term $\psi_u$ is directly inferred from the output of the classifier and the set of annotated proposals $\tilde{S}$. For example, the unary term for a proposal is the background or foreground estimate given to that proposal by the classifier or defined by a known proposal (e.g., a ground proof proposal). The object proposal labeling engine 108 can formulate an updated conditional probability $$P(y_i \mid x_i) = \lambda \cdot Q(C(x_i)) + \frac{(1-\lambda)}{2},$$

with a user-defined parameter $\lambda \in [0,1]$ modulating the influence of the classifier prediction (e.g., a SVM prediction) on the CRF initialization. In some cases, the parameter $\lambda$ can be set to 0.1. However, one of ordinary skill will appreciate that this is an illustrative example, and that other values for the parameter $\lambda$ can be used. The constant value $\hat{\epsilon}$ is an arbitrary number (e.g., a small number, such as a number close to 0, for example, 0.0001, 0.001, 0.01, or other suitable number) necessary to prevent the logarithmic function from approaching infinity when $l_i$ is equal to 0. The unary term $\psi_u$ is defined as a piecewise function:

$$e^{-\psi_u(y_i; x)} \begin{cases} l_i + \hat{\epsilon}, l_i \in L & s_i \in \tilde{S} \\ P(y_i \mid x_i) & s_i \notin \tilde{S} \end{cases} \quad (2)$$

The object proposal labeling engine 108 determines the pairwise potentials that are used in equation (1) as the pairwise term $\psi_p$. The pairwise potential for a proposal provides a confidence of a foreground estimate or a background estimate for the proposal. The confidence is based on a linear combination of features of the proposal and another proposal (making up a pair of object proposals) from the refined set of object proposals across the plurality of video frames in a video sequence. For instance, the pairwise potentials can ensure that proposals that are located in a similar position and/or have similar properties have similar foreground or background assignments, and do not randomly switch their foreground or background assignment. In the event a pair of proposals disagree (e.g., have a different label but have similar appearance, spatial characteristics, trajectory, temporal characteristics, or other feature), the energy is increased, based on equation (1), and the algorithm is penalized. Using equation (1), the energy can be minimized over the CRF so that the pairs are in agreement. In one example, the object proposal labeling engine 108 can assign foreground or background labels to every proposal that is not known, and can measure the energy. Different labels can be assigned until a desired energy is reached.

A label compatibility function $\mu$ is defined to be the Potts model $\mu(y_i, y_j)=[y_i \neq y_j]$, a Gaussian kernel is defined as $$k_*(x) = \exp\left(-\frac{x^2}{2\sigma_*^2}\right),$$

and scalar weights are defined as $w_*$. In order to distinguish proposals that have similar appearance but belong to different image regions, the pairwise potential $\psi_p$ can be defined to be a linear combination of several terms that jointly incorporate various features of the proposals, such as color, spatial, and temporal information. For example, the pairwise potential $\psi_p$ can be defined as a linear combination of an appearance kernel, a spatial kernel, a trajectory kernel, and a temporal kernel:

$$\psi_p(y_i, y_j; F) = [y_i \neq y_j] \cdot \underbrace{(w_c k_c(D_c(c_i, c_j))}_{\text{appearance kernel}} + \quad (3)$$

$$\underbrace{(w_s k_s(D_s(s_i, s_j))}_{\text{spatial kernel}} + \underbrace{(w_p k_p(D_p(p_i, p_j))}_{\text{trajectory kernel}} + \underbrace{(w_t k_t(|t_i - t_j|))}_{\text{temporal kernel}}.$$

The appearance kernel can take into account appearance features of a pair of object proposals. For example, the appearance kernel in equation (3) measures the difference in color between a pair of object proposals. In some examples, the color appearance $D_c$ is defined in terms of the chi-squared kernel $x^2(c_i, c_j)$, where $c_i$ and $c_j$ are normalized red-green-blue (RGB) color histograms of proposals $s_i$ and $s_j$, respectively, with 20 bins per dimension. Other numbers of bins per dimension can be used. In one illustrative example, two proposals that have similar color characteristics should have similar labels, and if a different label is assigned to each of the two proposals, a higher energy will be given. On the other hand, two proposals that have dissimilar color characteristics will not be penalized with a higher energy in the event the two proposals have different labels.

The spatial kernel can take into consideration spatial characteristics of a pair of proposals. In some examples, the spatial characteristics can include area and position. One of ordinary skill in the art will appreciate that other spatial characteristics can also be taken into account. The spatial kernel measures the difference in these characteristics between a pair of object proposals. For example, the spatial kernel can measure the amount of spatial overlap between two proposals, which depends on the spatial position in a frame and on the size (area) of the proposals. In some examples, the spatial relation between any pairs of proposals is defined in terms of the intersection-over-union:

$$D_s(s_i,s_j) = 1 - \left|\frac{s_i \cap s_j}{s_i \cup s_j}\right|.$$

For instance, the spatial kernel can determine the size of the union when the proposals of the pair are overlaid, and then the size of the intersection between these proposals. The absolute position of the proposals does not have to be known.

The trajectory and temporal kernels establish temporal connectivity among proposals, reducing the penalty of assigning different labels to those that are not intersected by the same trajectory (trajectory kernel) or that belong to a different frame (temporal kernel). For example, the trajectory kernel can define a point trajectory of a related point in a pair of object proposals across the plurality of video frames in a video sequence. In some cases, point trajectories can be determined for sets of points in the video at different frames that are known to correspond to the same point. As each point moves across the frames as the video temporally progresses, the movement of the points can be traced over each frame. Two proposals that are far away temporally (e.g., appear in frames that are far apart), but that share one or more of the trajectories (e.g., intersected by the same points) can be compared, and should be similarly labeled as foreground or background. The trajectory kernel exploits that the proposals used include compact sub-regions in the form of superpixels. Let $p_i \subset s_i$ and $p_j \subset s_j$ be the set of superpixels that share at least one point-track with $s_j$ or $s_i$, respectively. The term $D_p$ is defined based on the area that is intersected by common trajectories:

$$D_p(p_i,p_j) = 1 - \left|\frac{p_i \cup p_j}{s_i \cup s_j}\right|.$$

The trajectory kernel can add penalty to the energy for assigning different labels to proposals that share common trajectories.

The temporal kernel takes into account a temporal difference between proposals. For instance, the temporal kernel can define a difference between frame numbers of a pair of object proposals. In the temporal kernel term, $t_i$ and $t_j$ are the corresponding frame numbers of proposals $s_i$ and $s_j$. The temporal kernel reduces penalty for assigning different labels to proposals that are distant in time.

The different weights ($w_c$, $w_s$, $w_p$, and $w_t$) in equation (3) correspond to the importance of the kernel. The weights are dependent on a given data set, and can be user defined or automatically determined based on the data set. Illustrative examples of weights are described below.

The utilization by the object proposal labeling engine 108 of a maximum a posteriori (MAP) labeling of the random field $Y^* = \text{argmax}_{Y \in L} P(Y|X, F)$ minimizing the Gibbs energy $E(Y|X, F)$ produces the segmentation of the video with a background designation or a foreground designation for each object proposal of the refined set of object proposals $\overline{S}$.

To efficiently recover $Y^*$, the object proposal labeling engine 108 can implement a linear time O(N) algorithm for the inference of N variables on a fully-connected graph based on a mean field approximation to the CRF distribution. The efficiency of using the linear time O(N) algorithm comes with the limitation that the pairwise potential terms need to be expressed as a linear combination of Gaussian kernels having the form:

$$\psi_P(y_i, y_j; F) = \mu(y_i, y_j) \sum_{m=1}^{K} w_m k_m(f_i, f_j) \quad (4)$$

where each Gaussian kernel is defined as:

$$k_m(f_i, f_j) = \exp\left(-\frac{1}{2}(f_i, f_j)^T \Lambda_m (f_i - f_j)\right). \quad (5)$$

Euclidean embedding techniques can be employed to project F into Euclidean space in order to overcome this limitation. To enable the use of arbitrary pairwise potentials, a new representation of the data is used in which the $l_2$-norm is a good approximation to the distance of the original nonlinear space. In practice, given the original set of features F, a new embedding $\hat{F}$ is implemented into the Euclidean space $\mathbb{R}^d$ such that:

$$D(f_i, f_j) \approx \|\hat{f}_i - \hat{f}_j\|_2. \quad (6)$$

Landmark Multidimensional Scaling (LMDS) is used to conform the pairwise potential to Equation (4). LMDS is an efficient variant of Multidimensional Scaling that uses the Nystrom approximation to reduce the complexity from $O(N^3)$ to $O(Nmk+m^3)$, where N is the number of points, m is the number of landmarks, and k is the dimensionality of the new space. The pairwise potentials $\psi_p$ in Equation (3) are expressed as a linear combination of several terms.

For better control of the resulting embedding error, each of the components can be separately embedded. For each term of Equation (3), the dimensionality of the embedding space can be empirically determined from the analysis of the dissimilarity matrix eigenvalues. The resulting pairwise potential conforming to Equation (4) is:

$$\psi_p(y_i, y_j; \hat{F}) = [y_i \neq y_j](w_c k_c(\hat{c}_i, \hat{c}_j) + w_s k_s(\hat{s}_i, \hat{s}_j) + w_p k_p(\hat{p}_i, \hat{p}_j) + w_t k_t(t_i, t_j)). \quad (7)$$

The features $\hat{c}$, $\hat{s}$, $\hat{p}$ are Euclidean vectors of 10, 20 and 50 dimensions respectively. The temporal term t is already Euclidean, and so it does not require embedding.

Instead of determining the frame with the proposal that resembles the object most closely, and using that frame for the final segmentation, the final video segmentation described herein aggregates multiple proposals. In some examples, instead of trying to pick just one proposal, the object proposal labeling engine 108 can determine many proposals that can correspond to the entire foreground object or a portion of a foreground object (e.g., the leg of the object), and can then aggregate the proposals into the final segmentation. In some examples, to aggregate the proposals, each labeled proposal can cast a vote for all pixels that it includes or overlaps. The aggregate result of votes for pixels of a proposal yields the final foreground-background segmentation for that proposal. For example, a first proposal labeled background can overlap a first set of pixels and can vote those pixels as background, and a second proposal labeled foreground can overlap a second set of pixels and can vote those pixels foreground. The first set and second set of pixels can have overlapping pixels that have votes for both background and foreground. The majority of votes for a pixel can then determine the final label for the pixel. For example, a pixel that has more background votes can be labeled as a background pixel, even if it has one or more foreground votes.

In practice, the object proposal labeling engine 108 can compute the final video segmentation as the sum of the proposals weighted by the conditional probability P(y=fg|X, F) and scaled (e.g., scaled to range [0, 1]) on a per-frame basis. In some embodiments, as a final post-processing step, the segmentation can be refined with a median filter (e.g., with a width of 3 or other suitable width) applied along the direction of the optical flow across the images. The median filter has the effect of removing temporal instability that arises from different per-frame object proposal configurations. The final segmentation can then be thresholded by a term β to achieve a binary mask. The term can be empirically chosen as β=0.030. However, any suitable value for β can be used.

Figure 4:
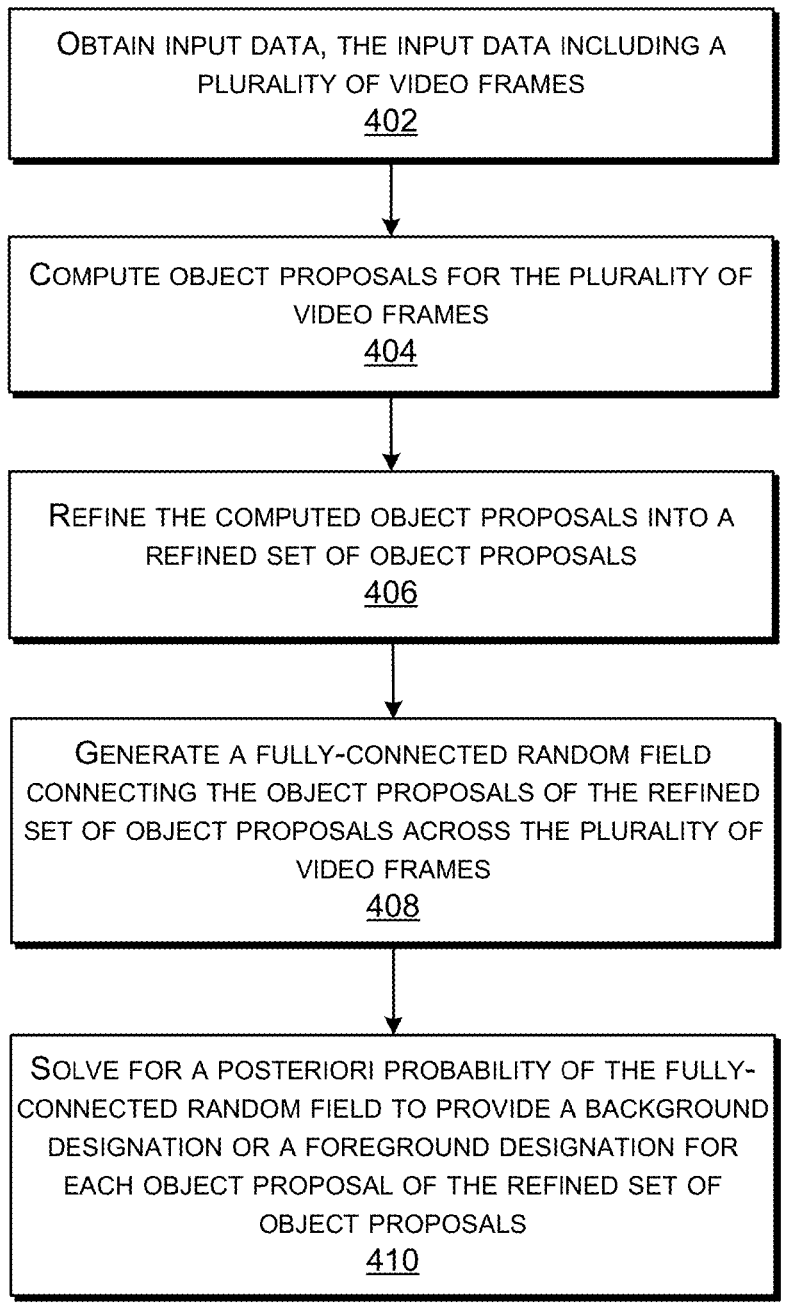
FIG. 4 illustrates an example of a process of performing video segmentation, in accordance with one embodiment of the present invention.

FIG. 4 illustrates an example of a process 400 of segmenting video data. Process 400 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 400 may be performed by a computing device, such as the video segmentation engine 102 or the computing system 800 implementing the video segmentation engine 102. For example, the computing system 800 may operate the video segmentation engine 102 to perform the process 400.

At 402, the process 400 includes obtaining input data. The input data includes a plurality of video frames. In some cases, the input data can also include one or more ground proof object proposals known to belong to a foreground object (or to a background object or region, in some instances).

At 404, the process 400 includes computing object proposals for the plurality of video frames. As described herein, an object proposal includes a region of a video frame that is a candidate for containing at least a portion of a background object or at least a portion of a foreground object. The process 400 can compute multiple object proposals per video frame. In some examples, some of the multiple object proposals per frame can be non-overlapping, and some of the object proposals can be overlapping (e.g., with one or more object proposals overlapping one or more other object proposals). The object proposals can be generated by the object proposal generator 104. In some embodiments, the input data includes the one or more ground proof object proposals. In such embodiments, one or more of the object proposals for the plurality of video frames are computed using the one or more ground proof object proposals.

At 406, the process 400 includes refining the computed object proposals into a refined set of object proposals. As described herein, the refined set includes fewer object proposals than the computed object proposals, such as only object proposals that have sufficient discriminative power (e.g., object proposals that do not overlap with both the foreground and background regions of a frame). In some embodiments, refining the computed object proposals into the refined set of object proposals includes extracting feature descriptors from the computed object proposals. A feature descriptor for an object proposal includes at least one or more of appearance features, motion features, or spatial (or objectness) features. A feature descriptor can include a vector, as described previously. Refining the computed object proposals can further include training a classifier with the feature descriptors. The classifier can also be trained using the ground proof object proposals (e.g., using the features of the ground proof proposals). As noted previously, the classifier can include any suitable classifier, such as a support vector machine (SVM) classifier. Refining the computed object proposals can further include selecting object proposals for the refined set of object proposals using the classifier. The selected object proposals include object proposals from the computed object proposals that include a non-overlapping background object proposal or a non-overlapping foreground object proposal, and thus that have sufficient discriminative power.

At 408, the process 400 includes generating a fully-connected random field. The fully-connected random field connects the object proposals of the refined set of object proposals across the plurality of video frames. In some cases, the fully-connected random field allows propagation of feature information between object proposals of the refined set of object proposals across the plurality of video frames. The fully-connected random field is described in more detail herein.

At 410, the process 400 includes solving for a posteriori probability of the fully-connected random field. The posteriori probability provides a background designation or a foreground designation for each object proposal of the refined set of object proposals. In some embodiments, solving for the posteriori probability of the fully-connected random field includes minimizing an energy function defined over a set of unary potentials and a set of pairwise potentials. In some cases, the unary potential include a foreground estimate or a background estimate for an object proposal based on a classifier (e.g., an SVM), as described above. In some cases, the unary potential can include a background or foreground designation based on a ground proof object proposal.

As described previously, a pairwise potential includes a confidence of a foreground estimate or a background estimate based on a linear combination of features of a pair of object proposals from the refined set of object proposals across the plurality of video frames. For example, the linear combination of features includes an appearance kernel defining a difference in color between the pair of object proposals, a spatial kernel defining a spatial overlap between the pair of object proposals, a trajectory kernel defining a point trajectory of a related point in the pair of object proposals across the plurality of video frames, or a temporal kernel defining a difference between frame numbers of the pair of object proposals. In some embodiments, the linear combination of features includes the appearance kernel, the spatial kernel, the trajectory kernel, and the temporal kernel, as shown in equation (3). In some embodiments, the pairwise potentials can be embedded into a Euclidean space, as previously described.

In some embodiments, a pixel in a video frame is included in multiple object proposals and includes multiple object proposal designations. The object proposal designations provide votes for a background designation or a foreground designation. In such embodiments, the process 400 includes selecting a background designation or a foreground designation for the pixel based on the votes. The final segmentation of the video can be based on the aggregate votes of multiple proposals across the video frames.

Using the techniques described above, an efficient approach to video segmentation is provided that exploits a fully connected spatiotemporal graph built over multiple object proposals over multiple video frames. The similarity term is mapped into a Euclidian space, which is computationally efficient for optimization and well suited for modeling long-range connections. The fully connected nature of the graph provides information exchange between both spatially and temporally distant object proposals across video frames, enabling the techniques to be robust in different situations, such as in difficult cases of fast frame-to-frame motion and object occlusions. The novel energy term defined in equations (1)-(3) incorporates sparse yet confident long range feature tracks, ensuring similar temporal labeling of objects. This is differentiated from prior methods of segmentation using object proposals may that minimize an energy function defined over a locally connected spatiotemporal graph. The techniques also enable the grouping of multiple overlapping proposals in the same frame, yielding robustness to outliers and incorrect proposal boundaries. Further, the final segmentation may not necessarily seek the best per-frame object hypotheses to perform the segmentation, but instead can aggregate or combine multiple, potentially imperfect proposals to improve overall segmentation accuracy and ensure robustness to outliers. Thus, while previous approaches are constrained to the selection of one proposal per frame, the techniques described herein allow the grouping of multiple overlapping proposals in the same frame. The object proposals allow computational challenges arising from higher resolution video data to be addressed, since the use of proposals greatly reduces computational complexity, allowing the techniques to employ a fully connected CRF over a complete video sequence.

Various examples are provided showing the results of the video segmentation techniques described herein. FIG. 5A, FIG. 5B, and FIG. 5C provide one example in which the techniques describe herein are used to provide a final segmentation of a cat 502 as a foreground object. The cat 502 is shown as the detected foreground object (with a green outline) in the three frames 500A, 500B, and 500C, and the remaining pixels in the frames are labeled as background. In FIG. 6A, FIG. 6B, and FIG. 6C, a lion 602 is segmented as the foreground object (with a green outline) in the frames 600A, 600B, and 600C, with the remaining pixels of the frames being labeled as background. The techniques are able to properly segment the proper foreground object, even in the presence of similar colors in both foreground and background regions, and when movement is present in the frames. FIG. 7A, FIG. 7B, and FIG. 7C, a horse 702 is segmented as the foreground object (with a green outline) in the frames 700A, 700B, and 700C, and the remaining pixels of the frames are labeled as background. The horse 702 is properly segmented as the foreground object even in view of the occlusion of the pole 704.

Various implementation details can be used to implement the above techniques. For example, the video segmentation engine 102 (or the computing system 1000) may include or be executed by a machine with 2 Intel Xeon 2.20 GHz processors with 8 cores each. The algorithm can be implemented in Python. Table 2 below shows the time consumption of each individual component for a sample video of 75 frames and resolution of 960×540. In some cases, it takes about 20 minutes to complete the segmentation, which is about 16 seconds per frame. The running time performance of the algorithm is comparable to the fastest existing methods.

TABLE 2

Running time in seconds for each individual stage to segment a video of 75 frames and spatial resolution 960 × 540.

| Stage | Time (seconds) |
|---|---|
| Optical flow | 113.1 |
| Object Proposals | 55.6 |
| Feature Extraction | 541.7 |
| SVM Classification | 42.7 |
| MDS Embedding | 78.4 |
| CRF Inference | 260.0 |
| Video Segmentation | 1091.5 |

The weights of the CRF pairwise potential $\psi_p$ of Equation (3) are specified in the dataset. For Freiburg-Berkeley Motion Segmentation (FBMS), the following weights can be used: $w_c=1.0$, $w_s=0.15$, $w_p=0.3$, and $w_t=0.2$ 2. For SegTrack segmentation, the impact of spatial-temporal relationships between proposals can be reduced by setting $w_s=w_t=0.01$. One of ordinary skill will appreciate that these are only examples, and that other suitable values for the weights can be used. In one example, the proposal generation step uses 200 seeds, 200 level sets, with the rejection overlap set to 0.95. A modification of parameters can include a reduction in the number of proposals for the evaluation of the CRF step only (without proposal pruning), which is discussed in detail below. For example, the number of proposals can be reduced using 30 seeds, 30 level sets, and rejection overlap threshold of 0.88. The parameter β that binarizes the final segmentation can be set empirically to 0.03 for FBMS and 0.07 for SegTrack.

Figure 8:
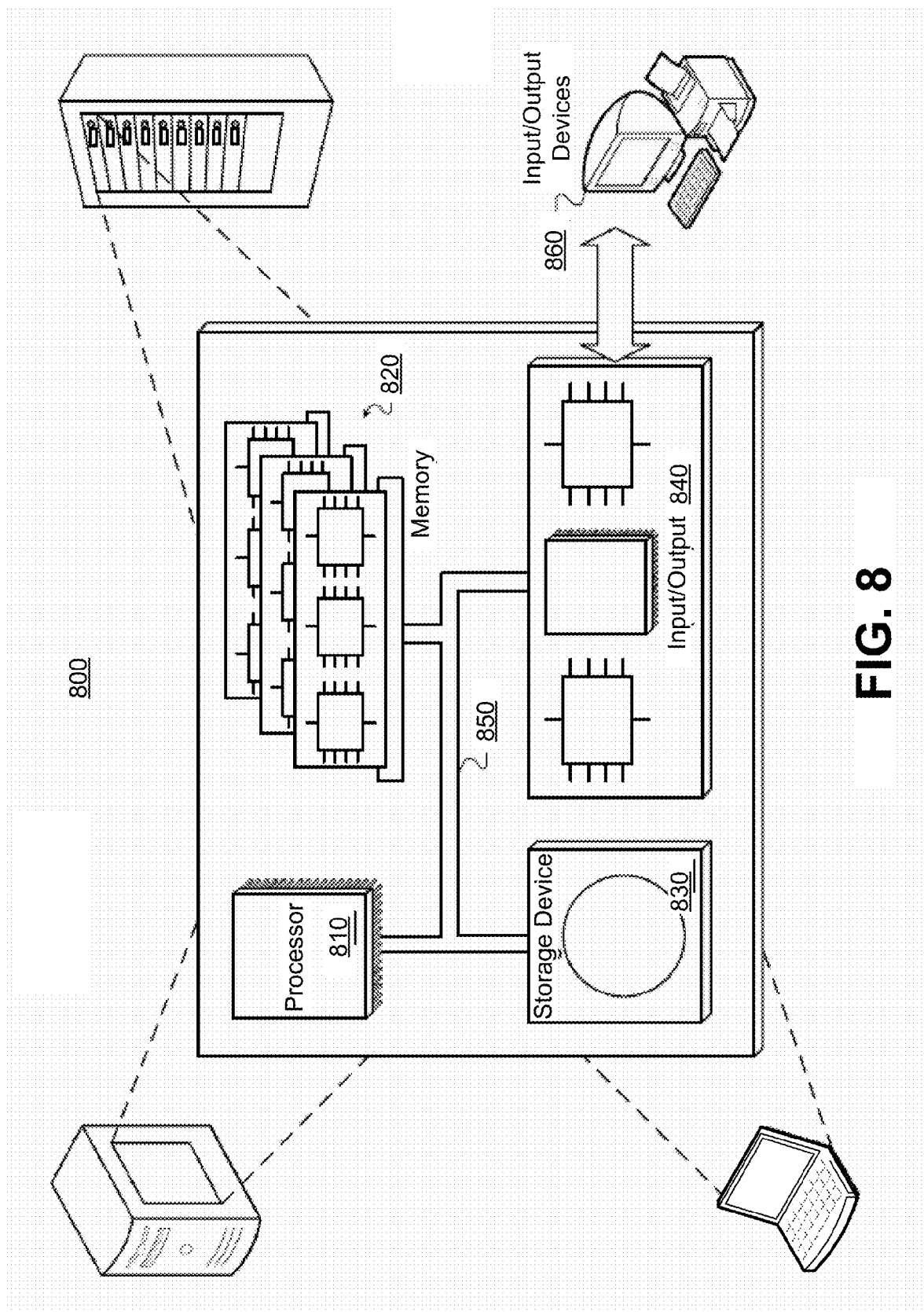
FIG. 8 shows an example of a computer system that may be used in various embodiments of the present invention.

Referring to FIG. 8, a schematic diagram is shown of an example of a computing system 800. The computing system 800 is exemplary only and one having skill in the art will recognize that variations and modifications are possible. The computing system 800 can be used for the operations described above. For example, the computing system 800 may be used to implement any or all of the motion capture techniques described herein.

The system 800 includes a processor 810, a memory 820, a storage device 830, and an input/output interface 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to provide graphical information via input/output interface 840 for display on a user interface of one or more input/output device 860.

The memory 820 stores information within the system 800 and may be associated with various characteristics and implementations. For example, the memory 820 may include various types of computer-readable medium such as volatile memory, a non-volatile memory and other types of memory technology, individually or in combination.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 860 provides input/output operations for the system 800. In one implementation, the input/output device 860 includes a keyboard and/or pointing device. In another implementation, the input/output device 860 includes a display unit for displaying graphical user interfaces.

The features described herein can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

What is claimed is:

1. A computer-implemented method of segmenting video data, the method comprising:
    obtaining input data, the input data including a plurality of video frames;
    computing object proposals for the plurality of video frames, an object proposal including a region of a video frame that is a candidate for containing at least a portion of a background object or at least a portion of a foreground object;
    refining the computed object proposals into a refined set of object proposals, the refined set including fewer object proposals than the computed object proposals;
    generating a fully-connected random field, the fully-connected random field connecting the object proposals of the refined set of object proposals across the plurality of video frames; and
    solving for a posteriori probability of the fully-connected random field, the posteriori probability providing a background designation or a foreground designation for each object proposal of the refined set of object proposals.

2. The method of claim 1, wherein the input data further includes one or more ground proof object proposals known to belong to a foreground object, and wherein the object proposals for the plurality of video frames are computed using the one or more ground proof object proposals.

3. The method of claim 1, wherein refining the computed object proposals into the refined set of object proposals includes:
   extracting feature descriptors from the computed object proposals, wherein a feature descriptor for an object proposal includes at least one or more of appearance features, motion features, or spatial features;
   training a classifier with the feature descriptors; and
   selecting object proposals for the refined set of object proposals using the classifier, wherein the selected object proposals include object proposals from the computed object proposals that include a non-overlapping background object proposal or a non-overlapping foreground object proposal.

4. The method of claim 1, wherein the fully-connected random field allows propagation of feature information between object proposals of the refined set of object proposals across the plurality of video frames.

5. The method of claim 1, wherein solving for the posteriori probability of the fully-connected random field includes minimizing an energy function defined over a set of unary potentials and a set of pairwise potentials, wherein a unary potential includes a foreground estimate or a background estimate for an object proposal based on a classifier, and wherein a pairwise potential includes a confidence of a foreground estimate or a background estimate based on a linear combination of features of a pair of object proposals from the refined set of object proposals across the plurality of video frames.

6. The method of claim 5, wherein the linear combination of features includes an appearance kernel defining a difference in color between the pair of object proposals, a spatial kernel defining a spatial overlap between the pair of object proposals, a trajectory kernel defining a point trajectory of a related point in the pair of object proposals across the plurality of video frames, or a temporal kernel defining a difference between frame numbers of the pair of object proposals.

7. The method of claim 1, wherein a pixel in a video frame is included in multiple object proposals and includes multiple object proposal designations, wherein the object proposal designations provide votes for a background designation or a foreground designation, and further comprising selecting a background designation or a foreground designation for the pixel based on the votes.

8. A system for segmenting video data, comprising:
   a memory storing a plurality of instructions; and
   one or more processors configurable to:
      obtain input data, the input data including a plurality of video frames;
      compute object proposals for the plurality of video frames, an object proposal including a region of a video frame that is a candidate for containing at least a portion of a background object or at least a portion of a foreground object;
      refine the computed object proposals into a refined set of object proposals, the refined set including fewer object proposals than the computed object proposals;
      generate a fully-connected random field, the fully-connected random field connecting the object proposals of the refined set of object proposals across the plurality of video frames; and
      solve for a posteriori probability of the fully-connected random field, the posteriori probability providing a background designation or a foreground designation for each object proposal of the refined set of object proposals.

9. The system of claim 8, wherein the input data further includes one or more ground proof object proposals known to belong to a foreground object, and wherein the object proposals for the plurality of video frames are computed using the one or more ground proof object proposals.

10. The system of claim 8, wherein refining the computed object proposals into the refined set of object proposals includes:
    extracting feature descriptors from the computed object proposals, wherein a feature descriptor for an object proposal includes at least one or more of appearance features, motion features, or spatial features;
    training a classifier with the feature descriptors; and
    selecting object proposals for the refined set of object proposals using the classifier, wherein the selected object proposals include object proposals from the computed object proposals that include a non-overlapping background object proposal or a non-overlapping foreground object proposal.

11. The system of claim 8, wherein the fully-connected random field allows propagation of feature information between object proposals of the refined set of object proposals across the plurality of video frames.

12. The system of claim 8, wherein solving for the posteriori probability of the fully-connected random field includes minimizing an energy function defined over a set of unary potentials and a set of pairwise potentials, wherein a unary potential includes a foreground estimate or a background estimate for an object proposal based on a classifier, and wherein a pairwise potential includes a confidence of a foreground estimate or a background estimate based on a linear combination of features of a pair of object proposals from the refined set of object proposals across the plurality of video frames.

13. The system of claim 12, wherein the linear combination of features includes an appearance kernel defining a difference in color between the pair of object proposals, a spatial kernel defining a spatial overlap between the pair of object proposals, a trajectory kernel defining a point trajectory of a related point in the pair of object proposals across the plurality of video frames, or a temporal kernel defining a difference between frame numbers of the pair of object proposals.

14. The system of claim 8, wherein a pixel in a video frame is included in multiple object proposals and includes multiple object proposal designations, wherein the object proposal designations provide votes for a background designation or a foreground designation, and wherein the one or more processors are configurable to select a background designation or a foreground designation for the pixel based on the votes.

15. A computer-readable memory storing a plurality of instructions executable by one or more processors, the plurality of instructions comprising:
    instructions that cause the one or more processors to obtain input data, the input data including a plurality of video frames;
    instructions that cause the one or more processors to compute object proposals for the plurality of video frames, an object proposal including a region of a video frame that is a candidate for containing at least a portion of a background object or at least a portion of a foreground object;

instructions that cause the one or more processors to refine the computed object proposals into a refined set of object proposals, the refined set including fewer object proposals than the computed object proposals;

instructions that cause the one or more processors to generate a fully-connected random field, the fully-connected random field connecting the object proposals of the refined set of object proposals across the plurality of video frames; and instructions that cause the one or more processors to solve for a posteriori probability of the fully-connected random field, the posteriori probability providing a background designation or a foreground designation for each object proposal of the refined set of object proposals.

16. The computer-readable memory of claim 15, wherein the input data further includes one or more ground proof object proposals known to belong to a foreground object, and wherein the object proposals for the plurality of video frames are computed using the one or more ground proof object proposals.

17. The computer-readable memory of claim 15, wherein refining the computed object proposals into the refined set of object proposals includes:

extracting feature descriptors from the computed object proposals, wherein a feature descriptor for an object proposal includes at least one or more of appearance features, motion features, or spatial features;

training a classifier with the feature descriptors; and selecting object proposals for the refined set of object proposals using the classifier, wherein the selected object proposals include object proposals from the computed object proposals that include a non-overlapping background object proposal or a non-overlapping foreground object proposal.

18. The computer-readable memory of claim 15, wherein solving for the posteriori probability of the fully-connected random field includes minimizing an energy function defined over a set of unary potentials and a set of pairwise potentials, wherein a unary potential includes a foreground estimate or a background estimate for an object proposal based on a classifier, and wherein a pairwise potential includes a confidence of a foreground estimate or a background estimate based on a linear combination of features of a pair of object proposals from the refined set of object proposals across the plurality of video frames.

19. The computer-readable memory of claim 18, wherein the linear combination of features includes an appearance kernel defining a difference in color between the pair of object proposals, a spatial kernel defining a spatial overlap between the pair of object proposals, a trajectory kernel defining a point trajectory of a related point in the pair of object proposals across the plurality of video frames, or a temporal kernel defining a difference between frame numbers of the pair of object proposals.

20. The computer-readable memory of claim 15, wherein a pixel in a video frame is included in multiple object proposals and includes multiple object proposal designations, wherein the object proposal designations provide votes for a background designation or a foreground designation, and wherein the one or more processors are configurable to select a background designation or a foreground designation for the pixel based on the votes.

* * * * *